US010915968B1

(12) United States Patent
Berger et al.

(10) Patent No.: US 10,915,968 B1
(45) Date of Patent: Feb. 9, 2021

(54) SYSTEM AND METHOD FOR PROACTIVELY MANAGING ALERTS

(71) Applicant: Intuit Inc., Mountain View, CA (US)

(72) Inventors: Marni Berger, Belmont, CA (US); Joseph William Wells, III, San Carlos, CA (US); Ariege Misherghi, San Jose, CA (US); Kristin Ann Carter, San Jose, CA (US); Aaron Brady, McKinney, TX (US); Soojin Jeong Lim, Saratoga, CA (US)

(73) Assignee: Intuit inc., Mountain View, CA (US)

( * ) Notice: Subject to any disclaimer, the term of this patent is extended or adjusted under 35 U.S.C. 154(b) by 997 days.

(21) Appl. No.: 14/555,264

(22) Filed: Nov. 26, 2014

(51) Int. Cl.
G06Q 40/00 (2012.01)
G06Q 10/10 (2012.01)

(52) U.S. Cl.
CPC .......... G06Q 40/12 (2013.12); G06Q 10/109 (2013.01)

(58) Field of Classification Search
None
See application file for complete search history.

(56) References Cited

U.S. PATENT DOCUMENTS

| | | | | |
|---|---|---|---|---|
| 6,711,624 B1 * | 3/2004 | Narurkar | ........... | G06F 17/30569 707/E17.006 |
| 8,566,184 B1 * | 10/2013 | Paluck | ................... | G06Q 40/06 705/30 |
| 2007/0129993 A1 * | 6/2007 | Alvin | ..................... | G06Q 30/02 705/7.32 |
| 2014/0074952 A1 * | 3/2014 | White | .................. | G06Q 10/107 709/206 |
| 2014/0244454 A1 * | 8/2014 | Grimes | .................. | G06Q 10/10 705/30 |
| 2014/0344185 A1 * | 11/2014 | Murguia | ................ | G06Q 40/06 705/36 R |

OTHER PUBLICATIONS

Squirrel SQL Client Plugins, Apr. 8, 2002, available at https://web.archive.org/web/*/http://squirrel-sql.sourceforge.net/plugins.html.*
"Bill Alert! 7 Ways Mint.com Helps You Stay on Top of Payments", Apr. 2014, available at https://web.archive.org/web/20140415112925/https://www.mint.com/personal-finance-4/bill-alert-7-ways-mint-helps-you-stay-on-top-of-payments (Year: 2014).*

* cited by examiner

*Primary Examiner* — Allen C Chein
(74) *Attorney, Agent, or Firm* — Paradice and Li LLP

(57) ABSTRACT

A system and method for managing alerts analyzes financial data received from multiple sources according to financial rules associated with a client consumer. Financial data not meeting one or more conditions of the financial rules is organized and presented to a financial professional managing the financial data on behalf of the client consumer. Some conditions of some financial rules are learned, based on events relating to the financial data. Some financial rules are performed for more than one client, while others are specific to a particular client.

40 Claims, 9 Drawing Sheets

Accountant | Jump to client ▼

MY FIRM
- Clients
- Staff
- ProAdvisor

MY BOOKS

My clients 8

5 INDIVIDUAL
3 BUSINESS

My Inbox
- Requests — 1 reponse
- Documents — 3 added

Bookkeeping ⑤
3 clients need attention — 802

Payroll ②

1 client needs attention

Taxes ④
no issues

800

Suggested Actions — 804

FLAGGED TRANSACTIONS
- 3 transactions made to closed books
- 1 transaction flagged by client
- 1 check cashed without a vendor
- 5 unlinked deposits ($4,967.00)

View ● My Bookkeeping Clients

New Client ▼

| NAME | BOOKS | CLOSED BOOKS | DOWNLOADED TRANSACTIONS | SALES TAX | LAST LOGIN |
|---|---|---|---|---|---|
| NEED ATTENTION(3) — 806 | | | | | |
| Nigel's Shipping Co | | 03/01/2014 | Download failed 76 days ago | $2,345.38 due soon 5/20/2014 | 1/12/14 3:01pm (Ben Brunt) 3/31/14 11:14am (Nigel Larkin) |
| Nigel Larkin • (650) 667-9069 | | | | | |
| Patsy's Landscaping | | 04/01/2014 | 32 unaccepted | $987.56 due soon 5/20/2014 | 4/1/14 1:00pm (Ben Brunt) 4/15/14 5:06pm (Patsy Davis) |
| Patsy Davis • (830) 221-1212 | | | | | |
| Name In Lights, Inc. | | 03/31/2014 | 6 days ago | $764.33 past due 7/20/2014 | 3/31/14 11:00AM (Ben Brunt) 3/16/14 1:01pm (Tim Smith) |
| Tim Smith (415) 333-4546 | | | | | |
| OTHER CLIENTS (2) — 808 | | | | | |
| Something Special, Inc. | Xers | | | | |
| Wonderland | | 04/15/2014 | 2 weeks ago | | 4/15/14 1:26am (Ben Brunt) 4/12/14 6:09pm (Willy Wonka) |

| ⓠⓑ Accountant | + | | ⚲ | ⚙ | ⓘ |
|---|---|---|---|---|---|

YOUR PRACTICE ›

⚐ Clients

▦ Team

♟ ProAdvisor

YOUR BOOKS ⌃

Go to client's QuickBooks ▾

‹ Alexander Landscaping   Gina Han  ✉ ⚯              New Request ▸
  ☐ They close at 5pm, best to call or email around noon.

Bookkeeping ⓘ    Payroll ②    Requests    Documents
─────────────────────
Books Closed: 01/14/15   Last sign in: 01/18/15   Last Download: 01/14/15

Account Watchlist                                              Review in QuickBooks  ⓠⓑ Essentials

| Account | CURRENT | LAST RECONCILED | |
|---|---|---|---|
| Checking Account | $12,345.00 | 01/30/2015 | 1 check without a payee — 906 |
| Accounts Receivable | $5,000.00 | 01/30/2015 | Check 2377 01/14/15  Update ▾ |
| Payables | $2,000.00 | 01/31/2015 | [Enter a payee] ← 904 |
| Undeposited Funds | $2,000.00 | 12/30/2014 | Books to Tax  902 |
| Sales Tax | | | Start now |
| Unclassified DTX | 39/$1,350.00 | | |

SYSTEM AND METHOD FOR PROACTIVELY MANAGING ALERTS

BACKGROUND

Managing a business is often complicated, and involves attention to detail in many important areas. One of the most important areas involves managing the financial aspects of the business. Ensuring that budgets are met, income and expenses are properly accounted for, taxes are determined and paid, and other financial details are handled correctly often falls to one or more financial professionals, including one or more knowledgeable people inside and/or outside the business.

Often, the financial professionals use a financial management system to manage and coordinate the business events associated with keeping a business operational. In some circumstances, a business will choose to manage its financial affairs by themselves, using a computing system implemented financial management application program locally installed and executed on a computing system of the business. In other circumstances, a business will choose to manage its financial affairs using a combination of one or more data entry and bookkeeping personnel inside the business, and one or more financial professions external to the business, such as bookkeepers, accountants, and tax professionals. These data entry and bookkeeping personnel inside the business, and one or more financial professionals external to the business may interact with the same set of financial data through a network-accessible financial management system.

The more complicated a business is, greater is the need for frequent interaction with the financial books of the business, such as when entering financial transactions, making payments, recognizing income, managing loans, and for any other financial activity taking place in the business.

However, as a business gets more complex, and the interactions with the financial books increase, so does the potential for missing important deadlines, determining whether errors have been introduced into the books, whether document filings with government entities are on time, and whether application processes are moving forward at a desired pace, for example, is critical to the success of the business.

Often, accountants and other financial professionals operating as agents of a business will routinely review the financial books, in order to determine whether problems exist such as typographical errors, missing information, uncategorized or miscategorized transactions, and tax related issues. The review is often very time consuming, and typically must take place, even if no problems are likely to be detected, because of the high degree of importance attributed to accuracy.

It would be therefore be beneficial for financial management systems to include an alert function which includes automated review processes that increases the likelihood of anomalous conditions being brought to the attention of a financial professional, without the need for detailed continuous review of financial books.

SUMMARY

In one embodiment, a system and method for proactively managing alerts includes one or more computing systems executing process operations which receive electronic data from multiple sources of different types, the electronic data including financial data of one or more client accounts of one or more financial professionals. A rule set includes one or more identified rules associated with one or more of the financial professional and the client or the client account associated with the financial data.

In one embodiment, analysis of the financial data determines whether one or more conditions of the identified rules are unsatisfied. Upon determining that one or more conditions are not satisfied by at least a portion of the financial data, alert data is generated representing an alert corresponding to the condition and the financial data to which the rule applies. The alert data is later displayed or otherwise presented to a representative of the business and/or a financial professional working for or otherwise acting on behalf of the business.

Using the system and method for proactively managing alerts, financial data for thousands of businesses having one or more client accounts are aggregated from hundreds of financial institutions, and are proactively analyzed according to rules data including one or more predetermined rules associated with one or more financial professionals and/or one or more of the client accounts.

In one embodiment, the system and method for proactively managing alerts executes as a network-accessible service distributed across one or more computing systems. In one embodiment, the system and method for proactively managing alerts independently executes on two or more computing systems that are geographically dispersed, sharing financial data, rules data and/or alert data between them.

In one embodiment, learning algorithms detect one or more rule conditions automatically, for example, by determining a normal time for receiving an external response to an application for a federal tax identification number, by determining one or more categories used for certain types of transactions, by determining one or more percentages associated with estimated tax payments, or for any other condition that takes place more than once. In one embodiment, previously determined normal values for one or more conditions are updated to new values as additional data is evaluated.

By improving financial management systems through proactively managing alerts, implementation of embodiments of the present disclosure allows for significant improvement to the field of artificial intelligence, as described above. Further, implementation of embodiments of the present disclosure allow for processing financial data as it is received, instead of having to wait until aggregation of data from many financial institutions is complete. By processing financial data as it is received, computing system efficiency is improved, due to the overall processing times being reduced. As a result, embodiments of the present disclosure allow for improved performance, and more efficient use of memory access and data storage capabilities. Consequently, computing systems implementing and/or providing the embodiments of the present disclosure are transformed into faster and more operationally efficient devices and systems.

BRIEF DESCRIPTION OF THE DRAWINGS

FIGS. 4 through 9 are screenshot mockups of various exemplary displays reflecting various aspects of alert presentation, in accordance with one or more embodiments.

Figure 1:
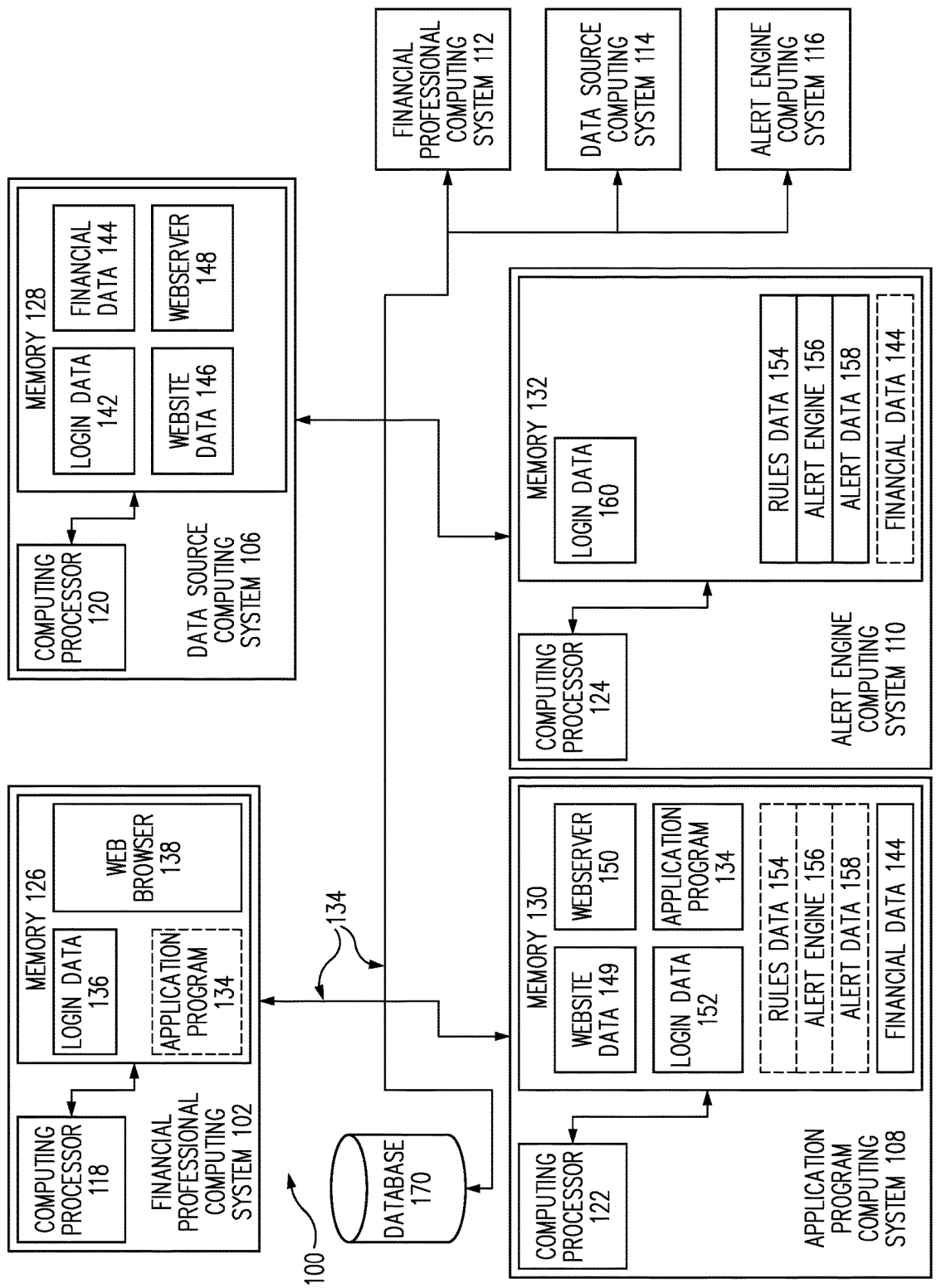
FIG. 1 is a functional block diagram showing the interaction of various elements for implementing one embodiment of a system and method for proactively managing alerts.

Common reference numerals are used throughout the figures and the detailed description to indicate like elements. One skilled in the art will readily recognize that the figures are examples and that other architectures, modes of operation, orders of operation and elements/functions can be provided and implemented without departing from the characteristics and features of the invention, as set forth in the claims. Unless specifically stated, operations discussed herein may be implemented in any order or combined, as determined by the designer of a system implementing the subject matter described herein.

DETAILED DESCRIPTION

A system and method for proactively managing alerts includes process operations performed by one or more computing systems. The process operations include aggregating financial data from multiple sources, such as data storage locations or computing systems. Following receipt of at least a portion of the financial data to be aggregated, one or more rules are identified which are associated with a financial professional and a client account associated with at least a portion of the financial data. Process operations further determine whether one or more conditions of a financial rule of the identified rules are not satisfied.

Further process operations generate and store alert data corresponding to the unsatisfied condition, and later display at least a portion of the alert data to an authorized party, such as a client employee or representative of the client, such as a financial professional acting on behalf of the client.

In one embodiment, analysis of the financial data determines whether one or more conditions of the identified rules are not satisfied. Upon determining that one or more conditions of a rule are not satisfied by at least a portion of the financial data applicable to the rule, alert data is generated representing an alert corresponding to the condition. The alert data is later displayed or otherwise presented to either or both of a representative of the business or a financial professional working for or otherwise acting on behalf of the business.

Alerts may be of varying levels of criticality or urgency, such as an urgent alert reflecting that one or more actions took place after a closing event relating to bookkeeping as compared with a less urgent alert reflecting that a payee is missing from a purchase transaction.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to convey the principles of the invention, as set forth in the claims, to those of skill in the art.

FIG. 1 is a functional block diagram showing the interaction of various elements for implementing one embodiment of a system and method for proactively managing alerts.

Referring to FIG. 1, in one embodiment, system 100 for proactively managing alerts includes one or more of a first computing system, such as financial professional computing system 102, operatively coupled through one or more communication channels, such as communication channel 104, to one or more of a data source computing system, such as data source computing system 106, an application program computing system, such as application program computing system 108, and an alert engine computing system, such as alert engine computing system 110, and to one or more additional computing systems, such as financial professional computing system 112, data source computing system 114 and alert engine computing system 116.

In one embodiment, various computing systems, such as financial professional computing systems 102 and 112, data source computing systems 106 and 114, application program computing system 108, and alert engine computing systems 110 and 116, each have one or more respective computing processors, such as computing processors 118, 120, 122 and 124. In one embodiment, the various computing systems, such as financial professional computing systems 102 and 112, data source computing systems 106 and 114, application program computing system 108, and alert engine computing systems 110 and 116, also each have one or more respective memories, such as memories 126, 128, 130 and 132. The respective computing processors, such as computing processors 118, 120, 122 and 124 are respectively coupled to associated memories 126, 128, 130 and 132, and are configured to execute instructions stored in those respective memories, such as computing processor executable instructions to perform a process, such as process operations included with application program 134 of application program computing system 108, such as process operations for proactively managing alerts. Two or more memories may be coupled to each processor, and two or more processors may be coupled to and thus share the same memory.

As used herein, the term "computing system" includes, but is not limited to, a network accessible computing resource, a standalone computing resource, a cloud computing asset, a virtual asset, a server computing system, a workstation, a desktop computing system, a mobile computing system, including, but not limited to, smart phones, portable devices, and/or devices worn or carried by a user, a database system or storage cluster, a switching system, a router, any hardware system, any communications system, any form of proxy system, a gateway system, a firewall system, a load balancing system, or any device, subsystem, or mechanism that includes components that can execute all, or part, of any one of the processes and/or operations as described herein.

In addition, as used herein, the term computing system can denote, but is not limited to, systems made up of multiple network accessible computing resources, standalone computing resources, cloud computing assets, virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

In one embodiment, two or more assets, such as computing systems and/or virtual assets, and/or two or more computing environments, are connected by one or more communications channels, such as communication channel 104, including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network", or alternatively, "communication channel", includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

In one embodiment, memory 126 of financial professional computing system 102 includes one or more of login data 136, web browser 138, and at least a portion of application program 134. In one embodiment, financial professional computing system 102 is a computing system operated by or otherwise under the control of a financial professional utilizing at least a portion of application program 134 which includes instructions to perform a process for proactively managing alerts.

In one embodiment, financial professional computing system 102 includes a standalone version of application program 134 which is configured to perform each of the process operations of a process for proactively managing alerts, as described herein. In one embodiment, financial professional computing system 102 includes at least a portion of a distributed version of application program 134 which is configured to cooperatively interact with one or more computing systems, such as application program computing system 108 to perform each of the application program and/or process operations of a process for proactively managing alerts described herein.

In one embodiment, memory 128 of data source computing system 106 includes one or more of login data 142, financial data 144, website data 146 and webserver 148.

In one embodiment, data source computing system 106 is an exemplary data source computing system, such as a financial institution computing system, for example, and is thus configured to receive, analyze, store, and provide financial data of one or more client accounts at one or more financial institutions. The financial institutions include, but are not limited to any business entity such as a bank, a credit union, a mortgage company, a stock brokerage, retail establishment, or any other business entity performing financial activities on behalf of one or more clients of one or more client accounts. In one embodiment, a financial activity is any type of activity involving the processing or analysis of payments, sale, income, loans, or any other type of activity involving the transfer of money to or from one or more client accounts. In one embodiment, a client account is typically a business arrangement, such as with a bank, to process and account for payments, receive and account for income, and perform other financial transactions, and/or to provide a record of those payments and other financial transactions, typically on the behalf of a client who owns or otherwise controls the client account. Examples of such client accounts include, but are not limited to, checking and savings accounts, 401K accounts, stock brokerage accounts, and credit card accounts.

In one embodiment, login data 142 includes client-specific login data, which when matched by login data submitted by another computing system, such as financial professional computing system 102 or application program computing system 108, on behalf of a client of one or more client accounts associated, for example, with a financial institution controlling data source computing system 106, authorizes access by the submitting computing system to one or more portions of financial data 144 that are associated with the client-specific login data, for example, through a website configured to present client-specific data.

As an example, application program computing system 108 is, in one embodiment, associated with many financial professionals, such as over one hundred (100) financial professionals who are managing many hundreds of client accounts of several hundred clients. Those client accounts, in one embodiment, are associated with various financial institution computing systems, such as data source computing system 106. When application program computing system 108 is directed by application program 134 to download data of a given client, application program computing system 108 provides at least a portion of login data 152 to data source computing system 106. Upon being provided the portion of login data 152, data source computing system 106 allows application program 134 to download a portion of financial data 144 representing financial data of the given client. The download operations, in one embodiment, occur regularly, such as hourly, twice a day, once a day, every week, or at any other regular time period. The download operations may further be triggered to occur, by a financial professional, or through other manual or automatic processes known to those of ordinary skill.

In various embodiments, transfer of at least a portion of financial data 144 may occur through a function configured to download at least a portion of financial data 144 to a computing system from which the matched login data was received, or through other means of providing access to financial data 144.

In another example, following client login data of login data 136 being provided by financial professional computing system 102 to data source computing system 106, financial professional computing system 102 is recognized to be operating on behalf of a respective client user having a client account managed by data source computing system 106. Following financial professional computing system 102 being granted access to financial data 144, at least a portion of financial data 144 is provided to financial professional computing system 102 through, for example, screen scraping of client-specific webpages provided by webserver 148.

In one embodiment, application program computing system 108 is a computing system hosting application program 134, such as a financial management program for managing the financial affairs of a person or business entity, or any other application program incorporating or otherwise employing or interfacing with the process for proactive management of alerts discussed herein.

Herein, application programs include, in one embodiment, but are not limited to, financial application programs for performing different financial functions, such as financial management, financial transaction management, tax preparation, Point Of Sale (POS), etc.

Examples of currently available types of financial management programs include, but are not limited to, computing system implemented and/or on-line personal financial management systems, packages, programs, modules, or applications, computing system implemented and/or on-line personal financial transaction management systems, packages, programs, modules, or applications, computing system implemented and/or on-line personal tax preparation systems, packages, programs, modules, or applications, computing system implemented and/or on-line personal banking systems, packages, programs, modules, or applications, computing system implemented and/or on-line personal accounting systems, packages, programs, modules, or applications, computing system implemented and/or on-line business financial management systems, packages, programs, modules, or applications, computing system implemented and/or on-line business financial transaction management systems, packages, programs, modules, or applications, computing system implemented and/or on-line Point Of Sale (POS) systems, packages, programs, modules, or applications; computing system implemented and/or on-line business tax preparation systems, packages, programs, modules, or applications, computing system implemented and/or on-line business banking systems, packages, programs, modules, or applications, computing system implemented and/or on-line invoicing systems, packages, programs, modules, or applications; computing system implemented and/or on-line business accounting systems, packages, programs, modules, or applications, computing system implemented and/or on-line inventory systems, packages, programs, modules, or applications, and computing system implemented and/or on-line, packages, programs, modules, or applications for managing payroll activities.

Specific examples of currently available types of financial management systems include the financial management systems offered by Quicken™, Quicken Online™, Mint™, Mint Online™, TurboTax™, Quickbooks™ and Quickbooks Online™ available from Intuit, Inc., of Mountain View, Calif.

In one embodiment, financial data 144 includes, but is not limited to, business or personal identification data, transactional data including payee identification and transaction details, payor identification data, date and time data, geolocation data associated with one or more transactions represented in the transaction data, and/or any other financial data deemed relevant by a designer of a particular implementation of application program 134 and process for proactively managing alerts.

In one embodiment, memory 130 of application program computing system 108 includes one or more of website data 149, web server 150, login data 152, and at least a portion of application program 134 which, in one embodiment, includes process instructions implementing process for proactively managing alerts. In one embodiment, application program computing system 108 further includes one or more of rules data 154, alert engine 156, alert data 158 and financial data 144.

In one embodiment, login data 152 includes financial professional-specific login data, which when matched by login data, such as at least a portion of login data 136, submitted by or on behalf of a financial professional operating or otherwise under the control of financial professional computing system 102, authorizes a computing system providing the financial professional-specific login data to perform one or more process operations of application program 134. For example, if a portion of login data 156 of financial professional computing system 102 is provided to application program computing system 108 and matches at least a portion of login data 152, application program 134 is configured, in one embodiment, to allow a financial professional associated with financial professional computing system 102 to engage with application program 134 to add, modify, or delete financial transactions, close the books for a given period, reopen the books for a given period, determine or pay taxes, or to perform any other task available to authorized users of application program 134.

In one or more embodiments, responsive to at least a portion of login data 152 being matched by login data provided by financial professional computing system 102, one or more application program 134 process operations are performed. In one embodiment, responsive to at least a portion of login data 152 being matched by login data provided by financial professional computing system 102, at least a portion of the process operations of application program 134 is provided by application program computing system 108 to financial professional computing system 102 for execution and performance of those process operations by financial professional computing system 102.

In one embodiment, financial professional computing system 102 interacts with application program computing system 108 through web browser 138 operating cooperatively with webserver 150 which provides financial professional specific web pages including website data 149 and at least a portion of financial data 144.

In one embodiment, login data 152 includes login data of one or more clients of one or more financial professionals. In one embodiment, following client login data of login data 152 being provided by application program computing system 108 to data source computing system 106, application program computing system 108 is recognized to be operating on behalf of a respective client having a client account managed by data source computing system 106. Following application program computing system 108 being granted access to financial data 144, at least a portion of financial data 144 may be provided to application program computing system 108 through, for example, screen scraping of client-specific webpages provided by webserver 148.

In one embodiment, alert engine 156 includes one or more of the process operations of a process for proactively managing alerts described herein. In one embodiment, alert engine 156 analyzes financial data 144 against rules data 154 to determine one or more conditions of one or more rules represented by rules data 154 which aren't satisfied. For example, in an embodiment where rules data 154 includes a rule that a financial transaction of financial data 144 must have a payee, and further where alert engine 156 determines that a financial transaction of financial data 144 doesn't have a payee, the condition is that a payee must exist, and that condition is not satisfied, due to the financial transaction of financial data 144 not having a payee.

In one embodiment, responsive to a determination that one or more conditions of one or more rules represented by rules data 154 aren't satisfied, alert data 158 is produced by alert engine 156.

In one embodiment, memory 132 of alert engine computing system 110 includes one or more of login data 160, rules data 154, alert engine 156, alert data 158 and financial data 144. In one embodiment, as depicted in FIG. 1, alert engine 156 is a module of a computing system, such as application program computing system 108, interoperating with an application program, such as application program 134, to proactively manage alerts as described herein.

In one embodiment, alert engine 156 is a network accessible service executing on a network accessible computing system, such as alert engine computing system 116, interoperating with an application program on a different computing system, such as application program 134 of financial professional computing system 102, to proactively manage alerts.

In one embodiment, alert engine 156 of application program computing system 108 is configured to interoperate both with one or more application programs such as application program 134 on application program computing system 108 and as a network accessible service configured to receive requests from an originating computing system and analyze financial data and then provide results back to the originating computing system, such as financial professional computing system 102.

In one embodiment, alert engine 156 is configured to be requested as an addon component to a standalone version of application program 134 of financial professional computing system 102. Thus, in one example, application program 134 of financial professional computing system 102 requests that application program computing system 108 provide computing processor executable instructions of alert engine 156 so that application program 134 of financial professional computing system 102 may execute those instructions, thus being able to receive the benefit of process for proactively managing alerts, as described herein. In one embodiment, at least a portion of alert engine 156 is provided to financial professional computing system 102, and optionally interoperates with another portion of alert engine 156 remaining on application program computing system 108.

The discussion above has included application program 134, login data 136, login data 142, login data 152, alert engine 156, rules data 154, and alert data 158 being located on one or more various computing systems. In one embodiment, process operations discussed herein accommodate storage of data and application process operation instructions within database 170. Therefore, all or part of any of application program 134, login data 136, login data 142, login data 152, alert engine 156, rules data 154, and alert data 158 are stored, in one embodiment, within database 170 and retrieved when needed.

Figure 2:
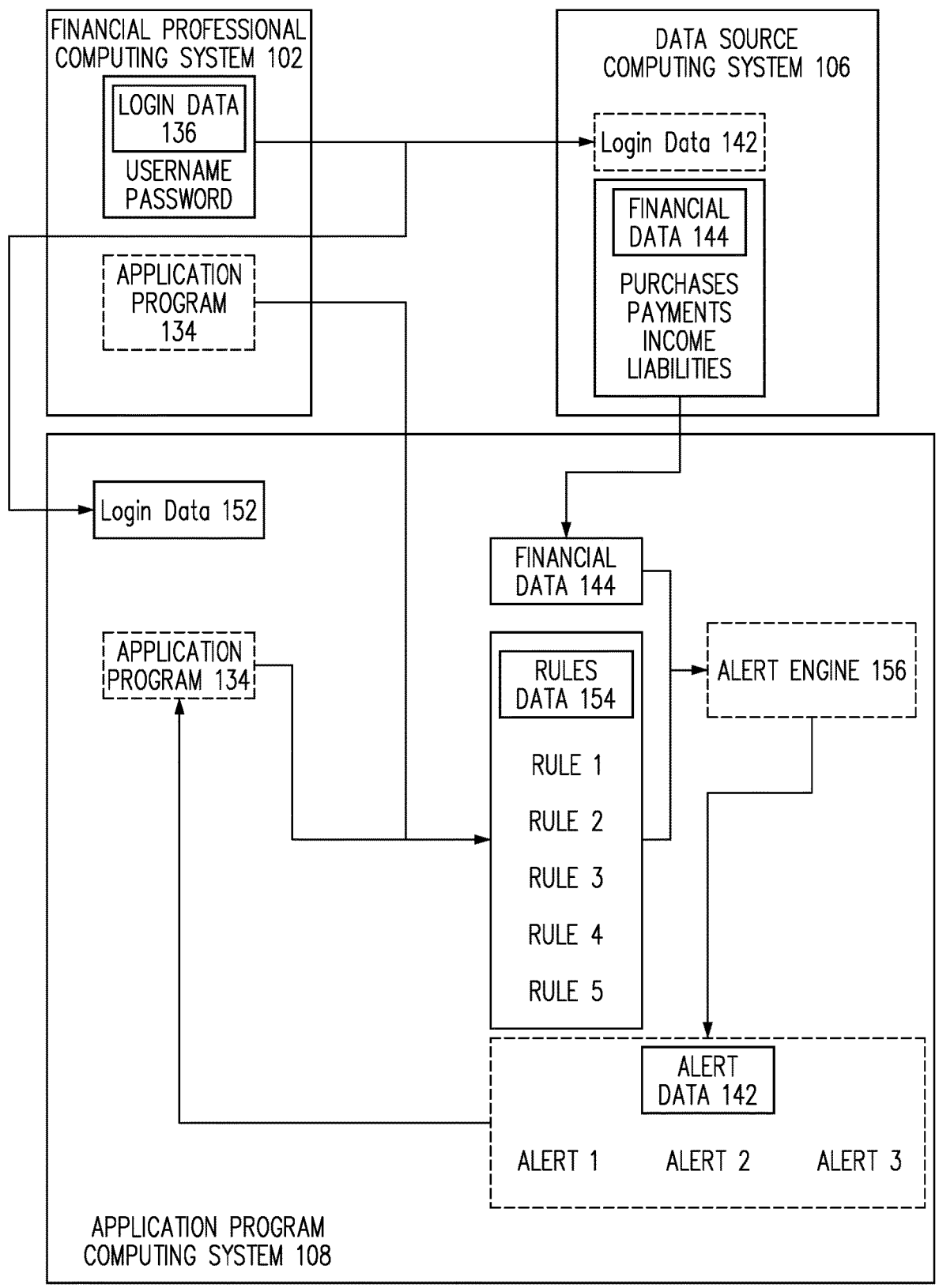
FIG. 2 is a data flow chart depicting data flow within a process for proactively managing alerts in accordance with one embodiment.

FIG. 2 is a data flow chart depicting data flow within a process for proactively managing alerts in accordance with one embodiment.

Referring to FIG. 1 and FIG. 2 together, login data 136 includes data which when matched with, for example, at least a portion of login data 142, identifies financial professional computing system 102 as being authorized to perform one or more operations by, with, or on data source computing system 106.

Login data 136 includes, in one embodiment, data identifying one or more authorized financial professionals of one or more financial professional computing systems 102 having one or more clients having financial data represented within financial data 144 of data source computing system 106.

In one embodiment, login data 136 includes one or more of a username, and a password. In one embodiment, login data 136 includes a network identifier such as an internet protocol (IP) address which uniquely identifies one or more computing systems known to be operated by an authorized person. Therefore, receipt of a known authorized IP address of financial professional computing system 102, for example, by data source computing system 106 or application program computing system 108, causes the receiving computing system to grant the originating computing system, such as financial professional computing system 102 authority to interact with the receiving computing system, to perform process operations, transfer data, etc.

Following, and responsive to a determination being made that financial professional computing system 102 is authorized to communicate with data source computing system 106, for example, at least a portion of financial data 144 is transferred from data source computing system 106 to financial professional computing system 102, for use by at least a portion of application program 134.

In one embodiment, financial data 144 includes transaction data representing one or more financial transactions between a client of a financial professional associated with financial professional computing system 102 and another person or business entity. In one embodiment, financial transaction data 144 includes one or more of purchase transactions with one or more vendors, payment transactions with one or more persons or business entities, income transactions, and liability transactions such as loan payments or receipts, mortgage payments and any other kinds of financial transactions known to those of ordinary skill.

Following a transfer of at least some of financial data 144 from data source computing system 106 to application program computing system 108, alert engine 156 analyzes the transferred financial data to determine whether one or more conditions of rules data 154 are not satisfied. In one embodiment, in the case of a rule being written in a negative context, such as a rule indicating "transaction cannot be missing a payee," alert engine analyzes the transferred financial data to determine whether one or more conditions of rules data 154 are satisfied. Whether a condition is written in the negative or positive is a matter for a designer of a particular implementation of process operations described herein. It is intended that both situations be interpreted as alert engine 156 analyzing the transferred financial data to determine whether one or more conditions of rules data 154 are not satisfied.

Rules data 154 includes one or more rules set forth by one or more parties, such as the system designers, system implementers, the client associated with a given financial account to which the data being analyzed pertains, or a financial professional. Rules data 154 further includes, in one embodiment, one or more rules that don't pertain to a client associated with data currently being analyzed, but which do pertain to a second or different client associated with other financial data of financial data 144.

As determinations are made that one or more conditions of rules data 154 are not satisfied, alert data is prepared or otherwise generated. In one embodiment, the alert data includes one or more of data regarding the unsatisfied condition and a link to the financial data that caused the alert data to be prepared.

In one embodiment, following the preparation of alert data, the alert data is distributed to one or more data storage locations for storage, and retrieved and later displayed for a financial professional or other interested party.

Figure 3:
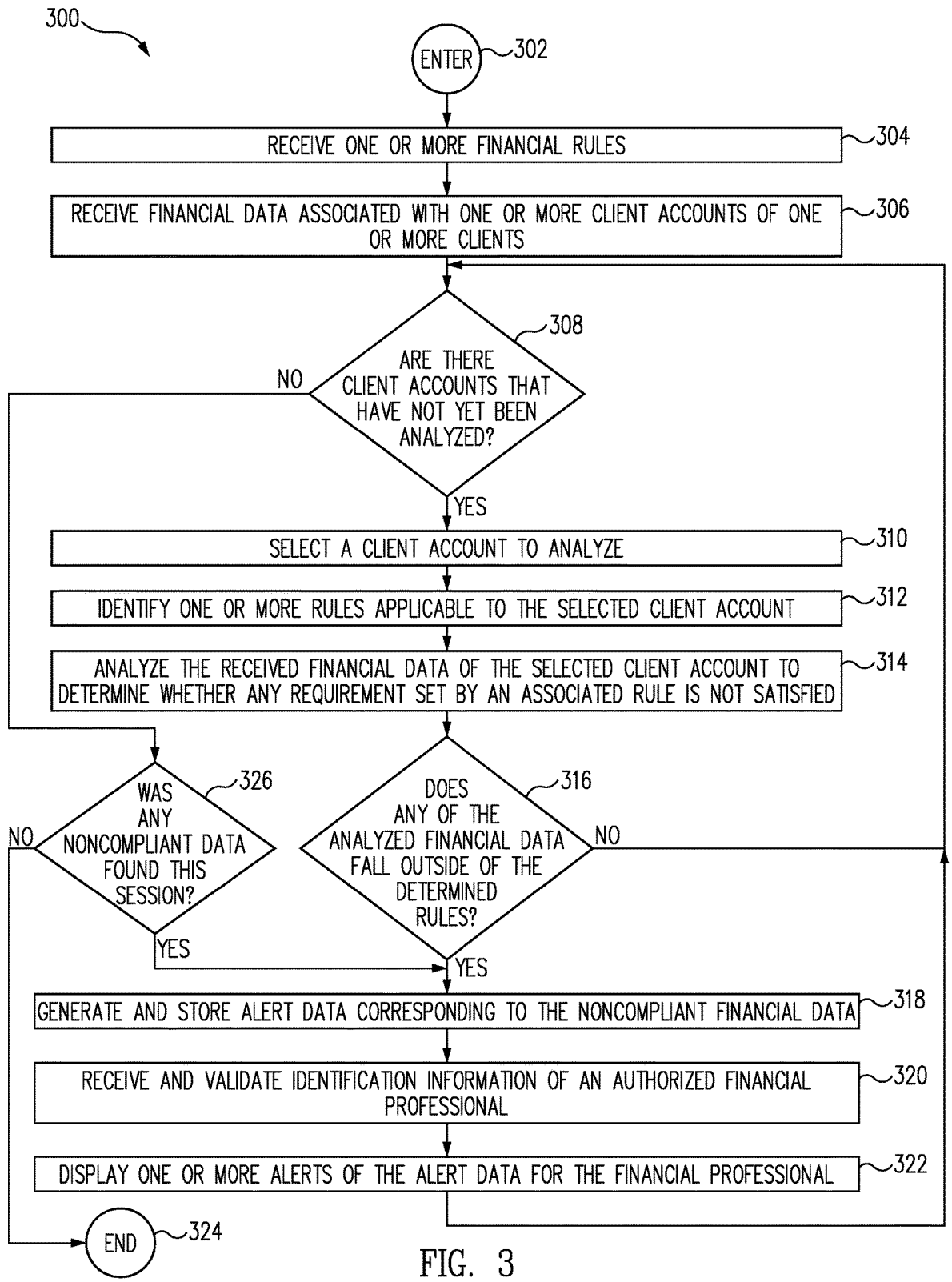
FIG. 3 is a flow chart depicting a process for proactively managing alerts in accordance with one embodiment.

FIG. 3 is a flow chart depicting a process for proactively managing alerts in accordance with one embodiment.

Referring to FIG. 1 and FIG. 3 together, process 300 for proactively managing alerts begins at ENTER OPERATION 302 and proceeds with RECEIVE ONE OR MORE FINANCIAL RULES OPERATION 304.

In one embodiment, at RECEIVE ONE OR MORE FINANCIAL RULES OPERATION 304, one or more rules to be applied to financial data 144 are received. In one embodiment, the one or more rules are provided by a financial professional, such as a financial professional managing at least one client account on behalf of a client associated with financial data 144. In one embodiment, rules data 154 includes assignment data designating one or more rules of rules data 154 to be applied to financial data of designated client accounts. Thus, a financial professional managing a first account and a second account may have rules 1, 4, and 5 associated with a first client account, and rules 2, 3, and 4 associated with a second client account.

Recall that financial data 144 may include financial data of more than one client of a given financial professional. In one embodiment, and in one example, a business entity associated with multiple financial professionals develops rules through sharing among those financial professionals. For example, a first financial professional develops a first rule to be applied to a first client account they manage, and a second financial professional is provided access to that first rule, and applies the first rule to one or more client accounts of the second financial professional.

In one embodiment, different financial professionals manage different aspects of one or more shared client accounts, such as when a first financial professional manages some or all bookkeeping related aspects of a first client account, and a second financial professional manages payroll related aspects. In such a circumstance, and in one embodiment, the first and second financial professionals are allowed to create and implement rules for the aspects of client accounts that they manage. In one embodiment, the first and second financial professionals have overlapping areas of responsibility with respect to at least one client account and thus are authorized to create and implement rules for the overlapping aspects of client accounts that they manage. In one embodiment, in addition to financial professionals having direct responsibility for management of client accounts, the financial professionals are themselves managed by supervisory personnel who are allowed to create rules for different types of client accounts across the entire firm, or across a subset of the firm, depending on circumstances.

In one embodiment, rules represented by the rules data include one or more of, but are not limited to rules regarding which transaction details, if any are required, which transaction details, if any, are allowed to be missing, rules regarding typographical errors, rules regarding when transactions may take place, when transactions may not take place, rules regarding transactions occurring within a certain geographical area, rules regarding transactions occurring outside a geographical boundary, rules regarding when the records may or must be closed for a given period, and what types of changes, if any are allowed after the closing, rules regarding when and how payroll occurs, and any other rule deemed necessary by a client or a financial professional managing one or more client accounts.

In one embodiment, learning functionality provides rules by analyzing situations and determining what is routine or otherwise normal, and applying the new rule to determine situations that are outside the normal condition. For example, in a situation where a document is filed with a government entity, such as a request for a tax ID number, and where this activity has been performed one or more times in the past with a response being received from the government entity, process 300 for proactively managing alerts learns what a normal response time is from the government entity, and uses that normal time in determining whether an alert should be generated based on the normal response time passing without a response being received. Thus, in this example, a rule provided by a financial professional requiring "tax ID number received within a normal time after application" would generate an alert after the process-determined normal time period has passed.

In addition to rules being received, rules may also be changed or deleted. For example, the rule "tax ID number received within a normal time after application" is, in one embodiment, automatically created and activated when an application for tax ID number has been made. Once a response to the application is received, and if the response is a tax ID number as expected, the rule "tax ID number received within a normal time after application" is deactivated, deleted, or otherwise rendered inoperable with respect to that particular financial data.

Further, the determination of a "normal" time is, in one embodiment, accomplished automatically, by alert engine 156, application program 134, or by any other suitable process. In one embodiment, prior to a first automatic determination of a normal time, as one example, a default time may be initially assumed. An update to what a normal time is may occur at any time, on regular intervals, for example, or whenever new data arrives that is relevant to the determination.

In one embodiment, following completion of RECEIVE ONE OR MORE FINANCIAL RULES OPERATION 304, process flow proceeds with RECEIVE FINANCIAL DATA ASSOCIATED WITH ONE OR MORE CLIENT ACCOUNTS OF ONE OR MORE CLIENTS OPERATION 306.

In one embodiment, at RECEIVE FINANCIAL DATA ASSOCIATED WITH ONE OR MORE CLIENT ACCOUNTS OF ONE OR MORE CLIENTS OPERATION 306, financial data associated with one or more client accounts is received. In one embodiment, the financial data is automatically sent from one or more data sources.

In one embodiment, financial data of financial data 144 is received periodically from network accessible data sources, such as data source computing system 106, such as daily, weekly, monthly or at any other periodic interval determined either by a designer of a particular implementation of application program 134 and/or process 300 for proactively managing alerts.

In one example, portions of financial data 144 originate at two or more data source computing systems, and are transferred, individually or together, to application program computing system 108.

In an embodiment where alert engine 156 is configured as a network accessible service, financial data 144 may either be transferred from data source computing system 106 to alert engine computing system 110 or application computing system 108, or may instead be accessed remotely by alert engine computing system 110 accessing financial data 144 at application program computing system 108. As previously discussed, instead of financial data 144 being moved two or more times, financial data 144 may be aggregated on database 170 and accessed by any computing system discussed herein, in order to perform process for proactively managing alerts. In one embodiment, financial data is received into application program computing system 108 through a user interface of one or more computing systems, such as through a web browser of financial professional computing system 102. In one embodiment, adding, deleting, and modifying financial data in a financial management system is considered to be receiving financial data, since a new set of financial data results from any of those activities.

In one embodiment, the financial data includes one or more of data identifying an account with which the data is associated, an amount of a transaction, a payee of a transaction, a payor of a transaction, a transaction data, an account number from which funds of a transaction were received, loan terms, dates of one or more financial professionals accessing financial data 144, or any other financial data relevant to application program 134 and alert engine 156.

In one embodiment, all available financial data is received at RECEIVE FINANCIAL DATA ASSOCIATED WITH ONE OR MORE CLIENT ACCOUNTS OF ONE OR MORE CLIENTS OPERATION 306 prior to proceeding further with process 300 for proactively managing alerts.

In one embodiment, at least a portion of the available financial data is received at RECEIVE FINANCIAL DATA ASSOCIATED WITH ONE OR MORE CLIENT ACCOUNTS OF ONE OR MORE CLIENTS OPERATION 306 prior to proceeding further with process for proactively managing alerts. Thus, for example, financial data may be received and processed by process 300 for proactively managing alerts on a transaction by transaction basis, an account by account basis, or using any other basis determined by a designer of a particular implementation of process 300 for proactively managing alerts.

Once enough data has been received to make determinations of whether conditions of rules are satisfied, further process operations discussed herein may be performed on that received data, while additional financial data is still being received.

In one embodiment, once at least a portion of available financial data has been received at RECEIVE FINANCIAL DATA ASSOCIATED WITH ONE OR MORE CLIENT ACCOUNTS OF ONE OR MORE CLIENTS OPERATION 306, process flow proceeds with ARE THERE CLIENT ACCOUNTS THAT HAVE NOT YET BEEN ANALYZED? OPERATION 308.

In one embodiment, at ARE THERE CLIENT ACCOUNTS THAT HAVE NOT YET BEEN ANALYZED? OPERATION 308, a determination is made of whether there are any client accounts that have not yet been analyzed. In one embodiment, client accounts are only considered when one or more changes have been made to the financial data of the client account since the client account was last analyzed.

In one example, a first client account that has not had any additions, deletions, opening or closing of books, payroll events, new rules added, or other changes is not analyzed. In one embodiment, such a client account that has not had any additions, deletions, opening or closing of books, payroll events, new rules added, or other changes is analyzed if there are any time-based rules associated with the client account. For example, in an example described above, a rule provided by a financial professional requiring "tax ID number received within a normal time after application" is a time-based rule because it requires the determination of whether a tax ID number is received within a period of time following an application being filed.

In one embodiment, at any time there is a determination made that all client accounts have been analyzed, a determination is made of whether financial data is still being received. If so, this process operation may be looped until it is determined that all changes have been made, or that all financial data of financial data 144 has been received. Further, in one embodiment, when one or more rules are time based, for example, where a response to a request for action by one or more parties is expected to be responded to, a time limit may be assigned after which an alert will be issued if the response hasn't been received. In those situations where a time-based rule applies to one or more client accounts, analysis of financial data 144 periodically takes place even if additional data has not been received. In one embodiment, financial data applying to one or more client accounts having rules will be analyzed, regardless of whether new data has been received.

In one embodiment, if, at ARE THERE CLIENT ACCOUNTS THAT HAVE NOT YET BEEN ANALYZED? OPERATION 308, a determination is made that there are client accounts that have not yet been analyzed, process flow proceeds with SELECT A CLIENT ACCOUNT TO ANALYZE OPERATION 310.

In one embodiment, at SELECT A CLIENT ACCOUNT TO ANALYZE OPERATION 310, a client account is selected to be analyzed for possible alert conditions.

In one embodiment, at SELECT A CLIENT ACCOUNT TO ANALYZE OPERATION 310, a client account is selected which is associated with data of financial data 144 that was most recently received from a data source, such as data source computing system 106, through user input from financial professional computing system 102, or through other means discussed herein or known to those of ordinary skill.

In one embodiment, at SELECT A CLIENT ACCOUNT TO ANALYZE OPERATION 310, in the case of multiple client accounts needing analysis, a client account is selected which has the greatest quantity of data needing analysis. In one embodiment, all financial data of all accounts is analyzed periodically, such as daily, weekly, monthly or at any other periodic interval determined either by a designer of a particular implementation of application program 134 and/or process 300 for proactively managing alerts.

In one embodiment, data needing analysis is data that has most recently been created, updated, or deleted. In one embodiment, in the case of accounts having time-based conditions associated with them, financial data associated with the time-based conditions are included in the determination of which client account is associated with the greatest quantity of data needing analysis.

In one embodiment, at SELECT A CLIENT ACCOUNT TO ANALYZE OPERATION 310, in the case of multiple client accounts having associated financial data needing analysis, a client account is selected which has associated financial data needing analysis where the analysis of the currently available data is expected to take longer than the analysis of financial data of one or more other client accounts also associated with financial data needing analysis.

In one embodiment, following the selection of a client account to analyze at SELECT A CLIENT ACCOUNT TO ANALYZE OPERATION 310, process flow proceeds with IDENTIFY ONE OR MORE RULES APPLICABLE TO THE SELECTED CLIENT ACCOUNT OPERATION 312.

In one embodiment, at IDENTIFY ONE OR MORE RULES APPLICABLE TO THE SELECTED CLIENT ACCOUNT OPERATION 312, one or more rules are identified that apply to the selected client account. In one embodiment, at IDENTIFY ONE OR MORE RULES APPLICABLE TO THE SELECTED CLIENT ACCOUNT OPERATION 312, one or more rules are identified that apply to the selected client accounts, such as one or more rules received at RECEIVE ONE OR MORE FINANCIAL RULES OPERATION 304.

In one embodiment, at IDENTIFY ONE OR MORE RULES APPLICABLE TO THE SELECTED CLIENT ACCOUNT OPERATION 312, one or more rules are identified according to the character of the financial data received at RECEIVE FINANCIAL DATA ASSOCIATED WITH ONE OR MORE CLIENT ACCOUNTS OF ONE OR MORE CLIENTS OPERATION 306. For example, if the character of at least a portion of the financial data to be analyzed is numerical, then one or more numerical-based rules are selected. In one example, a numerical rule is a rule that determines whether numerical-based financial data conforms to desired formats, is within a numerical range, or has any other relation to numerical conditions known to those of ordinary skill.

In another example, if the character of at least a portion of the financial data to be analyzed is time-based, then one or more time-based rules are selected. In one example, if a first action has been performed that is intended to trigger a response of any sort at some later time, the character of the first action is considered to be time-based. Thus, at some later time, such as after a default time period has passed since the first action occurred, a time-based rule will be triggered if the response has not been received, thus alerting a financial professional managing the associated client account of a condition requiring possible action.

If at least a portion of the financial data to be analyzed is financial transaction data, then one or more rules are selected that pertain to financial transaction data. In one example, financial transaction data includes one or more of payee data, amount data, date data, geographic data, or any other data evidencing a financial transaction that either has already taken place or is expected to take place at some point in the future. One example of a rule relating to financial transaction data is a rule requiring that payee data be included as at least a portion of the financial transaction data representing a financial transaction. Thus, a condition associated with the rule will produce an alert if data evidencing a financial transaction is received without associated payee data.

In one embodiment, following the identification of one of more rules at IDENTIFY ONE OR MORE RULES APPLICABLE TO THE SELECTED CLIENT ACCOUNT OPERATION 312, process flow proceeds with ANALYZE THE RECEIVED FINANCIAL DATA OF THE SELECTED CLIENT ACCOUNT TO DETERMINE WHETHER ANY REQUIREMENT SET BY AN ASSOCIATED RULE IS NOT SATISFIED OPERATION 314.

In one embodiment, at ANALYZE THE RECEIVED FINANCIAL DATA OF THE SELECTED CLIENT ACCOUNT TO DETERMINE WHETHER ANY REQUIREMENT SET BY AN ASSOCIATED RULE IS NOT SATISFIED OPERATION 314, at least a portion of the received financial data is analyzed against the selected rules to determine whether one or more requirements or conditions associated with the selected rules are not satisfied.

For example, if the financial data being analyzed is a financial transaction, and one of the selected rules for the client account requires that each financial transaction have a payee, the analysis performed at ANALYZE THE RECEIVED FINANCIAL DATA OF THE SELECTED CLIENT ACCOUNT TO DETERMINE WHETHER ANY REQUIREMENT SET BY AN ASSOCIATED RULE IS NOT SATISFIED OPERATION 314 determines whether the financial transaction data being analyzed includes payee data indicating a payee associated with the financial transaction. If payee data indicating a payee associated with the financial transaction does not exist, the rule and/or condition/requirement is deemed unsatisfied.

For example, if the financial data being analyzed is a financial transaction, and one of the selected rules for the client account requires that each financial transaction be categorized, the analysis performed at ANALYZE THE RECEIVED FINANCIAL DATA OF THE SELECTED CLIENT ACCOUNT TO DETERMINE WHETHER ANY REQUIREMENT SET BY AN ASSOCIATED RULE IS NOT SATISFIED OPERATION 314 determines whether the financial transaction data being analyzed includes categorization data indicating a category associated with the financial transaction. If categorization data indicating a category associated with the financial transaction does not exist, the rule and/or condition/requirement is deemed unsatisfied.

For example, if the financial data being analyzed is time-based, and one of the selected rules for the client account requires that each financial transaction have a payee, the analysis performed at ANALYZE THE RECEIVED FINANCIAL DATA OF THE SELECTED CLIENT ACCOUNT TO DETERMINE WHETHER ANY REQUIREMENT SET BY AN ASSOCIATED RULE IS NOT SATISFIED OPERATION 314 determines whether the financial transaction data being analyzed includes payee data indicating a payee associated with the financial transaction. If payee data indicating a payee associated with the financial transaction does not exist, the rule and/or condition/requirement is deemed unsatisfied.

In one embodiment, following completion of the analysis at ANALYZE THE RECEIVED FINANCIAL DATA OF THE SELECTED CLIENT ACCOUNT TO DETERMINE WHETHER ANY REQUIREMENT SET BY AN ASSOCIATED RULE IS NOT SATISFIED OPERATION 314, process flow proceeds with DOES ANY OF THE ANALYZED FINANCIAL DATA FALL OUTSIDE OF THE DETERMINED RULES? OPERATION 316.

In one embodiment, at DOES ANY OF THE ANALYZED FINANCIAL DATA FALL OUTSIDE OF THE DETERMINED RULES? OPERATION 316, an inquiry is made to determine whether any of the analyzed financial data doesn't meet one or more conditions set by the associated rules. In one embodiment, if there is at least one condition of a rule associated with the analyzed financial data that isn't satisfied, process flow proceeds with GENERATE AND STORE ALERT DATA CORRESPONDING TO THE NONCOMPLIANT FINANCIAL DATA OPERATION 318.

In one embodiment, at GENERATE AND STORE ALERT DATA CORRESPONDING TO THE NONCOMPLIANT FINANCIAL DATA OPERATION 318, alert data corresponding to one or noncompliant portions of the analyzed financial data is generated and stored. In one embodiment, the generated alert data includes a link to a data record where the noncompliant portion of the analyzed data is available to be updated, edited, deleted, or otherwise amended in some way to bring the noncompliant portion into compliance.

In one embodiment, the generated alert data includes a description of the unsatisfied condition. In one embodiment, the generated alert data includes a description of a status of the noncompliant financial data that is derived from the unsatisfied condition. In one embodiment, the generated alert data includes a reference to one or more records having the same unsatisfied alert condition. In one embodiment, the generated alert data includes a reference to a client who owns the financial data to which the alert relates, such as a client of a financial professional.

As an example, with an unsatisfied requirement or condition being "no changes to books for already closed periods," such as after books for a month or year have been closed, if there have been two changes, in this example, since the books were closed, the alert includes a number of changes that have occurred to financial data for that closed period. In one embodiment, and continuing with the example, the alert further includes respective links to the data records where the changes took place, i.e. where the noncompliant portion of the analyzed data is available to be updated, edited, deleted, or otherwise amended in some way to bring the noncompliant portion into compliance.

In one embodiment, the generated alert is stored within a computing system where the alert was generated, such as within alert engine computing system 110. In one embodiment, the generated alert is stored within a network-accessible database such as database 170 (FIG. 1).

Following the completion of generating and storing alert data at GENERATE AND STORE ALERT DATA CORRESPONDING TO THE NONCOMPLIANT FINANCIAL DATA OPERATION 318, process flow proceeds with RECEIVE AND VALIDATE IDENTIFICATION INFORMATION OF AN AUTHORIZED FINANCIAL PROFESSIONAL OPERATION 320.

In one embodiment, at RECEIVE AND VALIDATE IDENTIFICATION INFORMATION OF AN AUTHORIZED FINANCIAL PROFESSIONAL OPERATION 320, login data is received and validated to authenticate a financial professional or other user as being authorized to view alert data.

Referring now to FIG. 1 and FIG. 3 together, in one embodiment, at RECEIVE AND VALIDATE IDENTIFICATION INFORMATION OF AN AUTHORIZED FINANCIAL PROFESSIONAL OPERATION 320, at least a portion of login data 152 includes financial professional-specific login data, which when matched by login data, such as at least a portion of login data 136, submitted by or on behalf of a financial professional operating or otherwise under the control of financial professional computing system 102, authorizes a computing system providing the financial professional-specific login data to perform one or more process operations of application program 134. In one embodiment, the received and validated identification information is a network address of a computing system, such as an internet protocol (IP) address uniquely associated with an authorized computing system, such as financial professional computing system 102, known to be operated or otherwise under the control of an authorized person, such as an authorized financial professional, or an authorized client, an authorized person employed by a business, or any other authorized person known to those of ordinary skill.

For example, if a portion of login data 136 of financial professional computing system 102 is provided to application program computing system 108 and matches at least a portion of login data 152, application program 134 is configured, in one embodiment, to allow a financial professional associated with financial professional computing system 102 to engage with application program 134 to add, modify, or delete financial transactions, close the books for a given period, reopen the books for a given period, determine or pay taxes, or to perform any other task available to authorized users of application program 134.

In one or more embodiments, responsive to at least a portion of login data 152 being matched by login data provided by financial professional computing system 102, one or more application program 134 process operations are performed. In one embodiment, responsive to at least a portion of login data 152 being matched by login data provided by financial professional computing system 102, at least a portion of the process operations of application program 134 is provided by application program computing system 108 to financial professional computing system 102 for execution and performance of those process operations by financial professional computing system 102.

In one embodiment, following the authentication or validation of an authorized financial professional at RECEIVE AND VALIDATE IDENTIFICATION INFORMATION OF AN AUTHORIZED FINANCIAL PROFESSIONAL OPERATION 320, process flow proceeds with DISPLAY ONE OR MORE ALERTS OF THE ALERT DATA FOR THE FINANCIAL PROFESSIONAL OPERATION 322.

In one embodiment, at DISPLAY ONE OR MORE ALERTS OF THE ALERT DATA FOR THE FINANCIAL PROFESSIONAL OPERATION 322, a display of one or more alerts is generated and presented on a monitor or display component of a computing system operated by or under the control of the individual authorized at RECEIVE AND VALIDATE IDENTIFICATION INFORMATION OF AN AUTHORIZED FINANCIAL PROFESSIONAL OPERATION 320, such as an authorized person operating or otherwise controlling financial professional computing system 102.

FIGS. 4 through 9 are screenshot mockups of various exemplary displays reflecting various aspects of alert presentation, in accordance with one or more embodiments.

Presentations may be developed in a variety of formats, depending on need. For example, at DISPLAY ONE OR MORE ALERTS OF THE ALERT DATA FOR THE FINANCIAL PROFESSIONAL OPERATION 322 the alerts generated at GENERATE AND STORE ALERT DATA CORRESPONDING TO THE NONCOMPLIANT FINANCIAL DATA OPERATION 318 are presented, in one embodiment, as a list of alerts relating one or more of the type of alert, a client who owns the financial data to which the alert relates, and data regarding the unsatisfied condition that triggered the alert. In one embodiment, the alert data may be presented in one or more presentation screens presented as one or more website pages, such as one or more customized web pages presented by webserver 150 of application program computing system 108. In one embodiment, the alert data may be presented as one or more website pages, responsive to validating or otherwise authenticating a financial professional, a client, or other individual as an authorized party.

Referring now to FIGS. 3 through 9 together, table 400 is an exemplary presentation of alert data having rows 402, 404, 406, 408, 410, and 412 each individually representing summary data for different clients of a firm 444 of financial professionals. In one embodiment, one or more financial professionals of firm 444 are responsible for managing bookkeeping payroll and other financial related areas with respect to the different clients of column 426.

Column 426 reflects client data associated with each of the individual clients of rows 402, 404, 406, 408, 410, and 412. Similarly, columns 414, 416, 418, 420, 422, and 424 present various summary data regarding various statuses and alerts relating to bookkeeping, payroll, and miscellaneous areas of previously received financial data 144 (FIG. 1).

In one example, row 402 describes summary data for a client "Alexander Landscaping", the summary data reflecting at least two bookkeeping related alerts, such as two changes being two financial transactions that had previously been reconciled, and 32 financial transactions that have not yet been accepted. The summary data for client "Alexander Landscaping" further reflects the time-based payroll alerts, such as a tax being due and a form needing to be filed, with a date of Jan. 31, 2015 being reflected as an earliest due date associated with the two payroll alerts.

Correspondingly, rows 404, 406, 408, 410, and 412 represent similar summary data corresponding to other clients of firm 444.

Referring again to FIGS. 3 through 9 together, screenshot 500 reflects additional bookkeeping detail data for client "Alexander Landscaping" previously discussed with respect to row 402 of FIG. 4.

In one embodiment, reconciled data 502 and unaccepted transaction data 504 originate, in one embodiment, from alert data 158 (FIG. 1) and are displayed in screenshot 500.

In one embodiment, reconciled data 502 includes deep link 506 which, upon activation, triggers the presentation of a record screen (not shown) where the financial data of financial data 144 (FIG. 1) that triggered the generation of the alert is located. Thus, deep link 506 is linked to record data of financial data 144 that triggered the generation of the alert, and thus the data of financial data 144 that contains the unsatisfied condition that caused the alert.

Similarly, in one embodiment, transaction data 504 includes deep link 508 which, upon activation, triggers the presentation of a record screen (not shown) where the financial data of financial data 144 (FIG. 1) that triggered the generation of the alert is located. Thus, deep link 508 is linked to record data of financial data 144 that triggered the generation of the alert, and thus the data of financial data 144 that contains the unsatisfied condition that caused the alert.

Figure 4:
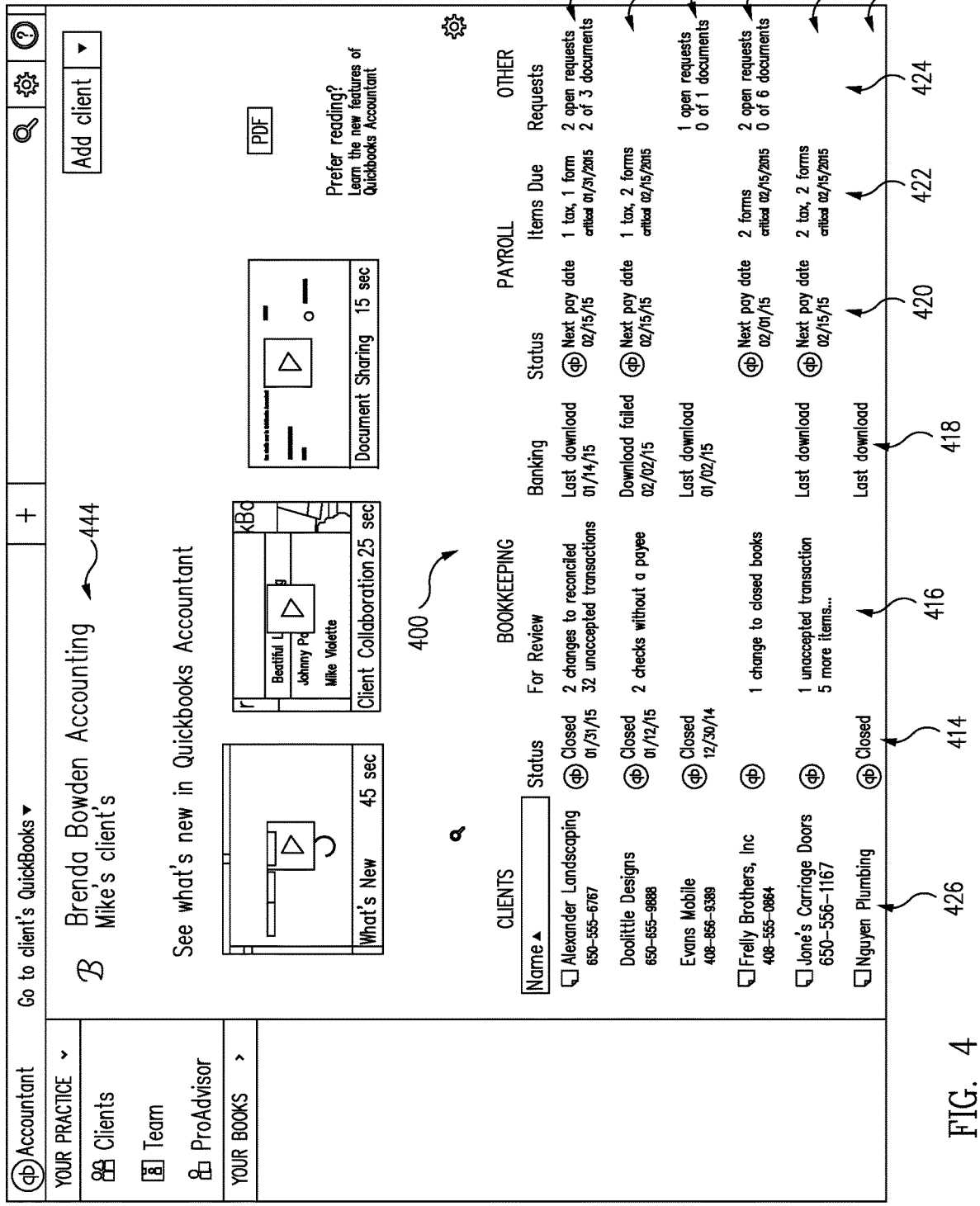
Figure 5:
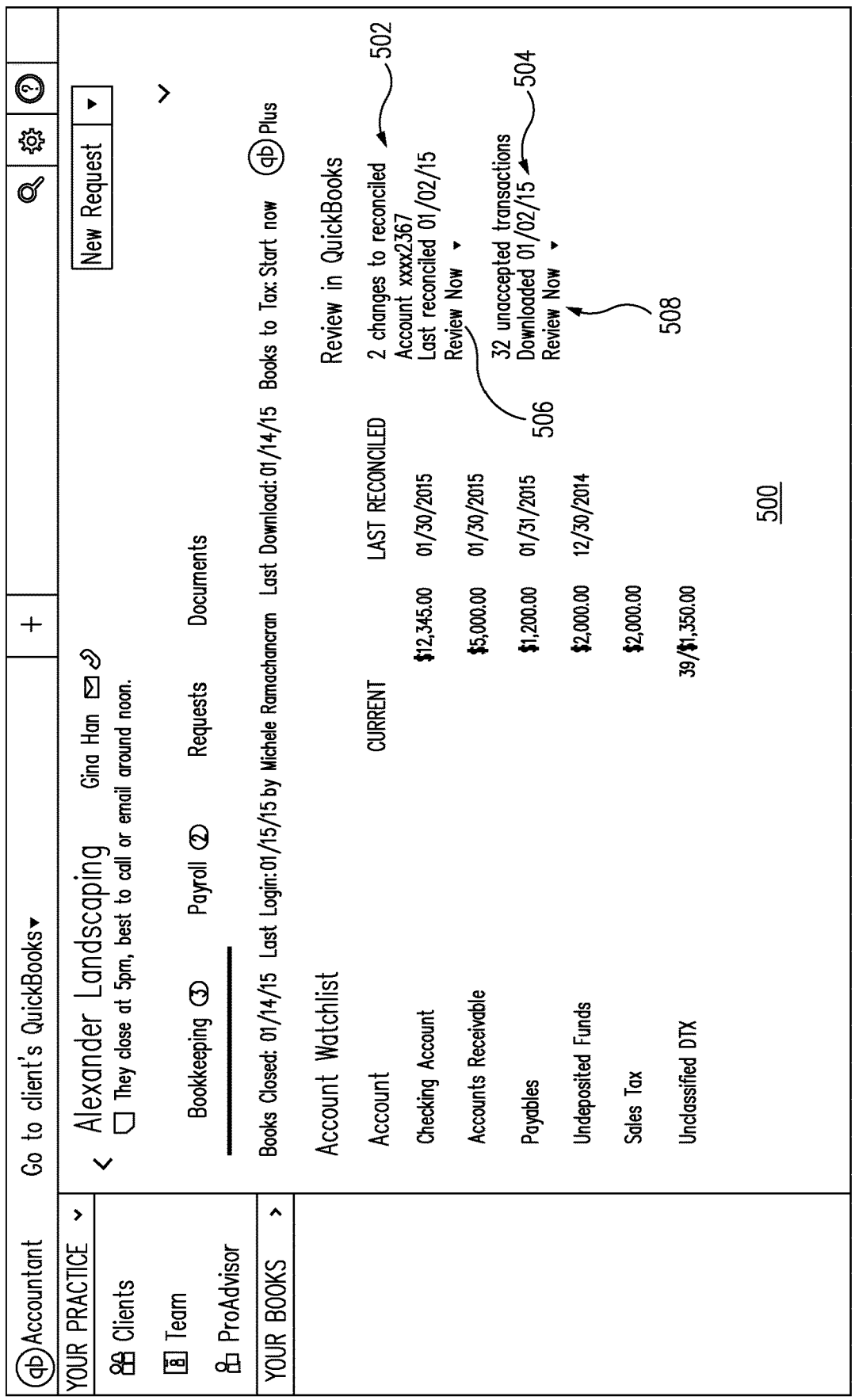
Figure 6:
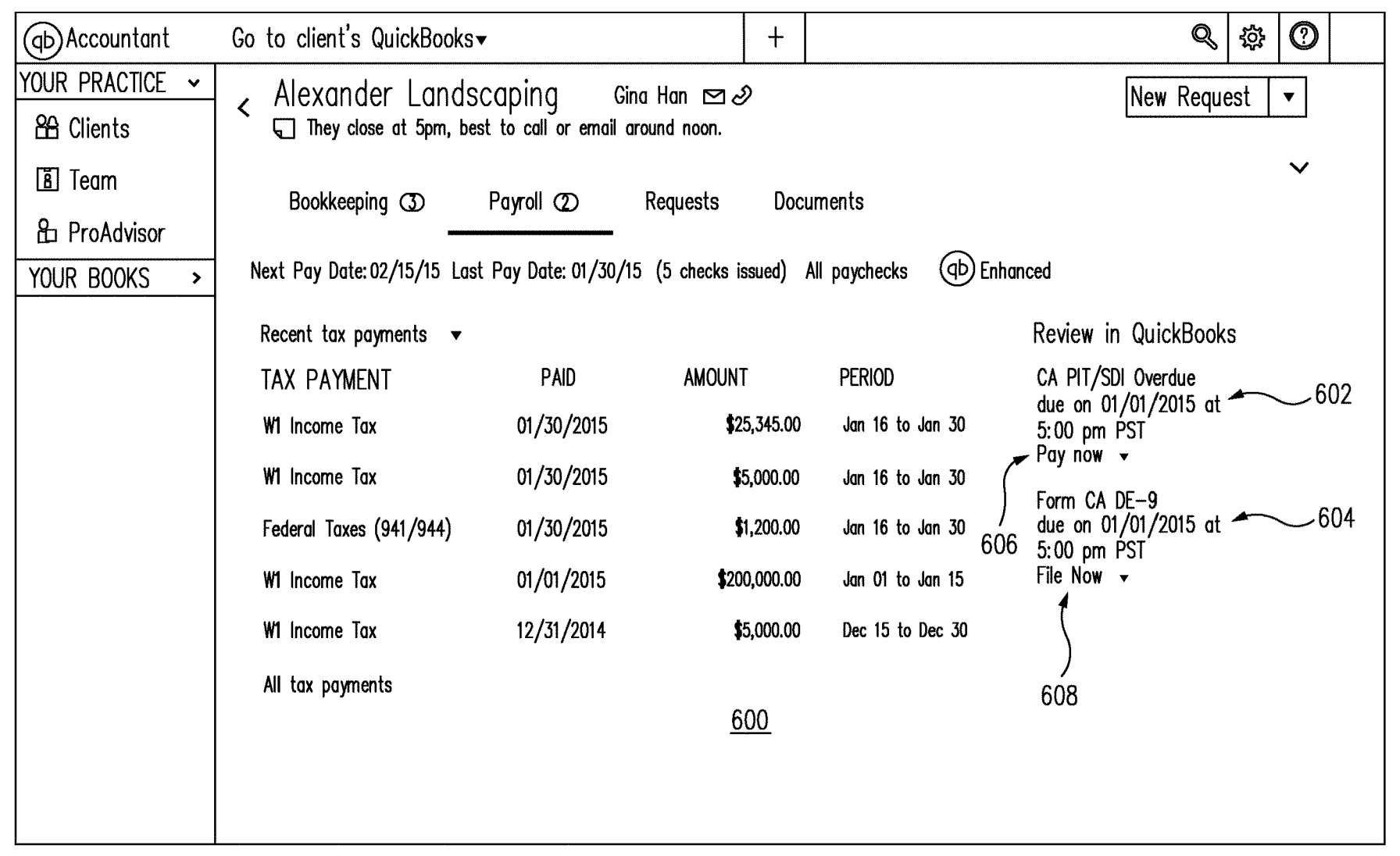

Screenshot 600 of FIG. 6 reflects additional payroll detail data for client "Alexander Landscaping" previously discussed with respect to row 402 of FIG. 4.

In one embodiment, tax data 602 and form data 604 originate, in one embodiment, from alert data 158 (FIG. 1) and are displayed in screenshot 600 (FIG. 6).

In one embodiment, tax data 602 includes deep link 606 which, upon activation, triggers the presentation of a record screen (not shown) where the financial data of financial data 144 (FIG. 1) that triggered the generation of the alert is located. Thus, deep link 606 is linked to record data of financial data 144 that triggered the generation of the alert, and thus the data of financial data 144 that contains the unsatisfied condition that caused the alert.

Similarly, in one embodiment, form data 604 includes deep link 608 which, upon activation, triggers the presentation of a record screen (not shown) where the financial data of financial data 144 (FIG. 1) that triggered the generation of the alert is located. Thus, deep link 608 is linked to record data of financial data 144 that triggered the generation of the alert, and thus the data of financial data 144 that contains the unsatisfied condition that caused the alert.

Figure 7:
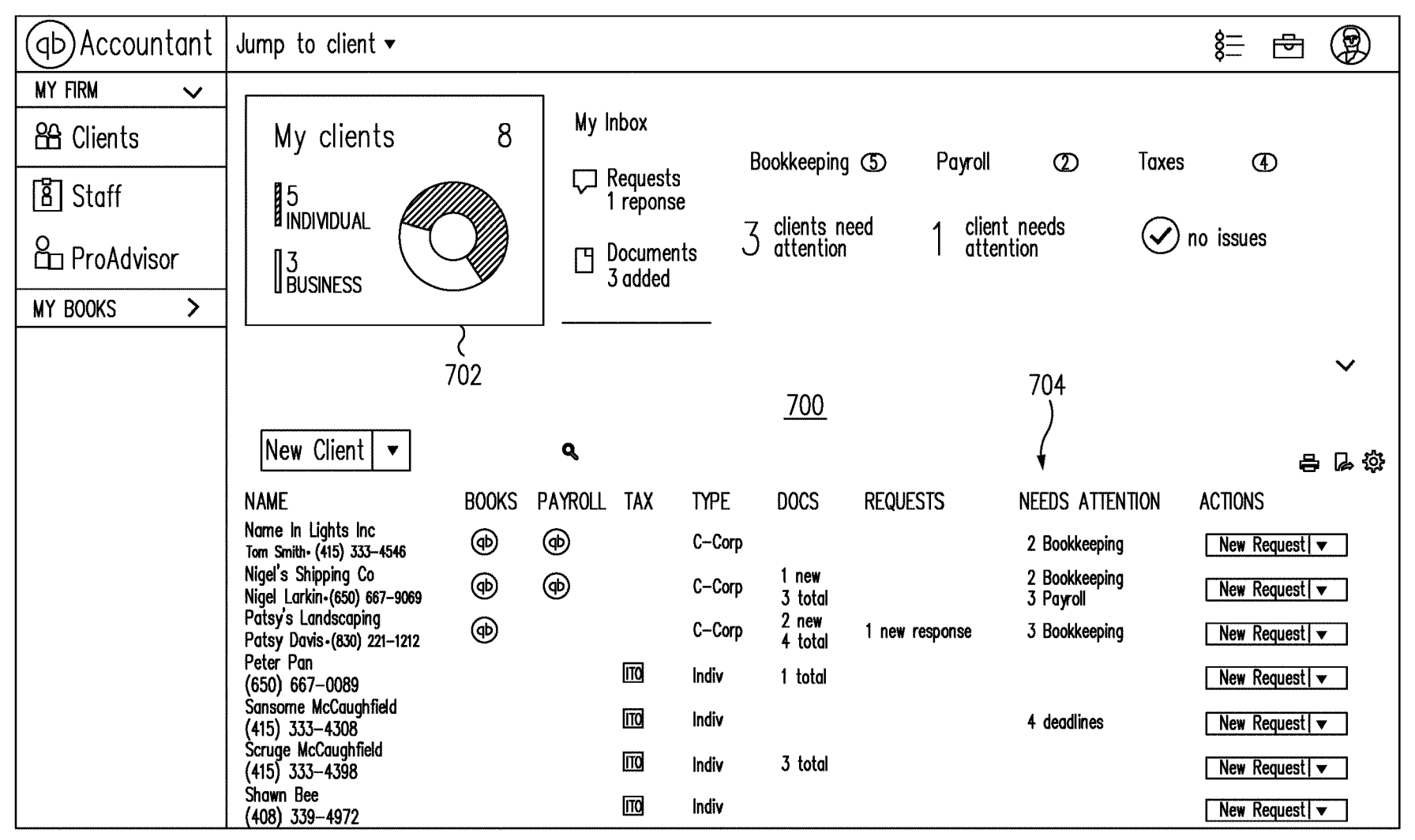

In one embodiment, screenshot 700 of FIG. 7 includes a summary icon 702 which, when activated, triggers the presentation of table 704 without any priority placed on the presentation of any particular client data.

In one embodiment, screenshot 800 of FIG. 8 includes a summary icon 802 which, when activated, triggers the presentation of table 804 with priority placed on the presentation of bookkeeping clients having financial data of financial data 144 that caused the generation of one or more payroll alerts of alert data 158 (FIG. 1). Note that, in this exemplary embodiment, the clients of client listing 806, which are associated with payroll alerts, are prioritized ahead of, and thus are listed above, clients of client listing 808 that are not associated with any payroll alerts.

In addition to or as an alternative to deep linking directly into a record screen where the financial data of financial data 144 (FIG. 1) that triggered the generation of the alert is located, a summary page or a detail page, such as that shown in screenshot 900 of FIG. 9 includes, in one embodiment, an alert presentation including a text box, such as text box 902 directly linking to the record data, and a description 904. Upon a text entry being made at the summary or detail page, and optionally accompanied by activation of update icon 906, the underlying record data associated with the generated alert is changed to reflect the data of text box 902.

Following, and responsive to new data being integrated into the record data, a new evaluation and analysis of the changed record data is made, in one embodiment, in order to determine whether the changed data meets all conditions of any rules associated with the particular record data.

Following the display, at DISPLAY ONE OR MORE ALERTS OF THE ALERT DATA FOR THE FINANCIAL PROFESSIONAL OPERATION 322 of alert data, such as alert data 158 generated at GENERATE AND STORE ALERT DATA CORRESPONDING TO THE NONCOMPLIANT FINANCIAL DATA OPERATION 318, process flow proceeds with ARE THERE CLIENT ACCOUNTS THAT HAVE NOT YET BEEN ANALYZED? OPERATION 308 as previously discussed.

If, in one embodiment, at ARE THERE CLIENT ACCOUNTS THAT HAVE NOT YET BEEN ANALYZED? OPERATION 308, a determination is made that there are no client accounts that have not yet been analyzed, process flow proceeds with WAS ANY NONCOMPLIANT DATA FOUND THIS SESSION? OPERATION 326.

In one embodiment, at WAS ANY NONCOMPLIANT DATA FOUND THIS SESSION? OPERATION 326, a determination is made as to whether there was any noncompliant data found in the most recent data analysis. If so, process flow proceeds with GENERATE AND STORE ALERT DATA CORRESPONDING TO THE NONCOMPLIANT FINANCIAL DATA OPERATION 318 as previously discussed.

If, in one embodiment, at WAS ANY NONCOMPLIANT DATA FOUND THIS SESSION? OPERATION 326, a determination is made that there was not any noncompliant data found in the most recent data analysis, process flow proceeds with END OPERATION 324 where the process terminates, awaiting new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language, and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for managing alerts comprising:
an application computing system confiugred to execute an application program and coupled to a network;
an alert engine configured to operate as at least two separate executable optional add-on components of one or more software programs, at least first and second components of the alert engine stored in a database external to the application computing system;
a financial professional computing system coupled to the network;
at least one computing processor; and
at least one memory coupled to the at least one computing processor, the at least one memory having stored therein instructions which when executed by the at least one computing processor perform operations comprising:
requesting, by the application program, that the first component of the alert engine be provided by the database to the application program;
receiving, at the application computing system from the financial professional computing system, login data including financial professional specific login data of a financial professional which matches previously provided login data of the application computing system;
in response to receiving the matching login data, providing by the application program computing system at least a portion of application program process operations to the financial professional computing system;
receiving, at the application program, the first component of the alert engine;
in response to receiving the first component, executing the first component, the execution of at least a portion of the first component interacting with a third component of the alert engine present on a financial computing system distinct from the application computing system;
continually aggregating, using data source login credentials of specified financial professionals and specified clients at the application computing system, financial data from a plurality of data sources, the aggregated financial data including financial data of different types and corresponding to the specified clients and specified financial professionals, the aggregation process an ongoing process during which other process operations are executed;

receiving, at the application computing system, two or more financial rules each of which is associated with client accounts of at least two client consumers, a first one of the received financial rules active for a first client account of a first client but not for a second client account of a second client, and at least a second one of the received financial rules active for the second client account of the second client but not for the first client account of the first client, at least one of the received two or more rules created by a financial professional having supervisory responsibility across an entire firm, at least two rules received from two different financial professionals having joint responsibility for at least a same single client account, at least one or the received rules regarding financial transactions occurring outside a geographical boundary;

analyzing, at the alert engine, the financial data to determine that a requirement set by one or more of the active financial rules of a particular client account is not satisfied, the analysis of a given client account including only rules applicable to the given client account, the analysis beginning with a respective client account having a greatest quantity of data needing analysis, proceeding with a next client account having a next-greatest quantity of data needing analysis, and continuing until all client accounts having data needing analysis have been analyzed;

storing, at the alert engine, alert data indicating one or more alerts associated with one or more unsatisfied conditions, the stored alert data including a link to a data record for which a noncompliant portion of the analyzed data is configured for amendment to bring the noncompliant portion into compliance;

receiving, following storage of the alert data, identification data from the financial professional computing system;

validating the identification data as associated with an authorized financial professional user of the application program;

automatically learning, by a learning function, a normal time for receiving an external response from an external entity, the normal time determined from one or more past events requiring a response from the external entity following an application submission that requires a response;

automatically establishing, by the learning function, an alert-based rule configured to trigger the generation of alert data following the passage of the normal time period without receiving a response to a submitted application;

retrieving, in response to receiving the validation, stored alert and link data corresponding to one or more alerts associated with one or more client consumers of the authorized financial professional user, the alert data generated in response to a triggered rule; and displaying, in response to determining a financial professional responsible for a client account associated with stored alert data, at the financial professional computing system, the stored alert and link data.

2. The system of claim 1, wherein the application program is selected from the group of application programs consisting of:

a financial application program;

a tax preparation application program;

a bookkeeping application program;

an application program for generating profit and loss reports;

an application program for generating invoices;

an accounting application program; and an application program for managing payroll activities.

3. The system of claim 1, wherein the alert engine is configured to execute as a network accessible service on an alert computing system coupled through the network to the application computing system.

4. The system of claim 1, wherein the application computing system is configured to execute the alert engine.

5. The system of claim 1, wherein the application computing system is the same computing system as the financial professional computing system.

6. The system of claim 5, wherein the alert engine is configured to be dynamically loaded into and executed by the application program, on request of the application program.

7. The system of claim 1, wherein the financial rules include rules data associated with each financial rule, the rules data indicating one or more financial professionals associated with each financial rule.

8. The system of claim 1, wherein a first financial rule is associated with a first financial professional, a second financial rule is associated with a second financial professional, and a third financial rule is associated with both of the first and second financial professionals.

9. The system of claim 1, wherein receiving the financial rules comprises receiving financial professional input selecting one or more financial rules from a set of one or more previously constructed financial rules and associating the selected one or more financial rules with one or more client accounts of at least one client consumer associated with the financial professional.

10. The system of claim 1, wherein receiving the financial rules comprises receiving a first rule from a supervisory professional having a supervisory level of authority of a business entity of the financial professional, the received first rule to be applied to a plurality of accounts of the business entity, the plurality of accounts associated with different financial professionals of the business entity.

11. The system of claim 1, wherein the financial rules are associated with one or more client accounts of a subset of one or more client consumers associated with a given financial professional.

12. The system of claim 1, further comprising displaying, at a supervisory professional computing system, a subset of the alert data.

13. The system of claim 1, wherein at least a portion of the alert data is displayed in tabular form, and one or more alerts are configured to be linked through user-activatable links to detail data associated with the at least a portion of the alert data.

14. The system of claim 1, wherein the one or more alerts are further configured to be linked directly to a data location within financial data of the client consumer at which a correction may be entered to eliminate the condition that caused the alert to be generated.

15. The system of claim 1, wherein the identification data is a network address of an authorized financial professional user of the application program.

16. The system of claim 1, wherein the identification data is a username and/or password of an authorized financial professional user of the application program.

17. A method for managing alerts performed by any set of one or more computing processors coupled to one or more memories, comprising:

requesting, by the application program, a first component of an alert engine to be provided by the database to the application program, the alert engine configured to operate as at least two separate executable optional add-on components of one or more software programs, at least first and second components of the alert engine stored in a database external to an application computing system executing the application program;

receiving, at the application computing system from the financial professional computing system, login data including financial professional specific login data of a financial professional which matches previously provided login data of the application computing system;

in response to receiving the matching login data, providing by the application program computing system at least a portion of application program process operations to the financial professional computing system;

receiving, at the application program, the first component of the alert engine;

in response to receiving the first component, executing the first component, the execution of at least a portion of the first component configured to interact with a third component of the alert engine present on a financial computing system distinct from the application computing system;

continually aggregating, using data source login credentials of specified financial professionals and specified clients at the application computing system, financial data from a plurality of data sources, the aggregated financial data including financial data of different types and corresponding to specified clients of specified financial professionals, the aggregation process an ongoing process during which other process operations are executed;

receiving two or more financial rules each of which is associated with client accounts of at least one two client consumers, a first one of the received financial rules active for a first client account of a first client but not for a second client account of a second client, and at least a second one of the received financial rules active for the second client account of the second client but not for the first client account of the first client, at least one of the received two or more rules created by a financial professional having supervisory responsibility across an entire firm, at least two rules received from two different financial professionals having joint responsibility for at least a same single client account, at least one or the received rules regarding financial transactions occurring outside a geographical boundary;

analyzing the financial data to determine whether a condition set by one or more of the active financial rules of a particular client account is not satisfied, the analysis of a given client account including only rules applicable to the given client account, the analysis beginning with a client account having a greatest quantity of data needing analysis, proceeding with a next client account having a next-greatest quantity of data needing analysis, and continuing until all client accounts having data needing analysis have been analyzed;

storing alert data indicating one or more alerts associated with one or more unsatisfied conditions, the stored alert data including a link to a data record at which a noncompliant portion of the analyzed data is configured for amendment to bring the noncompliant portion into compliance;

receiving, following storage of the alert data, identification information of a financial professional;

validating the identification information as associated with an authorized financial professional user of the application program;

automatically learning, by a learning function, a normal time for receiving an external response from an external entity, the normal time determined from one or more past events requiring a response from the external entity following an application submission that requires a response;

automatically establishing, by the learning function, an alert-based rule configured to trigger the generation of alert data following the passage of the normal time period without receiving a response to a submitted application;

retrieving, in response to receiving the validation, stored alert and link data corresponding to one or more alerts associated with one or more client consumers of the authorized financial professional user, the alert data generated in response to a triggered rule; and displaying, in response to determining a financial professional responsible for a client account associated with stored alert data, at a financial professional computing system, at least a portion of the stored alert and link data.

18. The method of claim 17, wherein the application program is selected from the group of application programs consisting of:
a financial application program;
a tax preparation application program;
a bookkeeping application program;
an application program for generating profit and loss reports;
an application program for generating invoices;
an accounting application program; and
an application program for managing payroll activities.

19. The method of claim 17, wherein analyzing the financial data further comprises analyzing the financial data by an alert engine to determine whether a condition set by one or more of the financial rules of a client account is not satisfied and the alert engine is executing as a network accessible service on an alert computing system coupled through the network to an application computing system executing the application program.

20. The method of claim 17, wherein the alert engine is configured to be dynamically loaded into and executed by the financial professional computing system, on request of the application program.

21. The method of claim 17, wherein the financial rules include rules data associated with each financial rule, the rules data indicating one or more financial professionals associated with each financial rule.

22. The method of claim 17, wherein a first financial rule is associated with a first financial professional and a second financial rule is associated with a second financial professional, and a third financial rule is associated with both of the first and second financial professionals.

23. The method of claim 17, wherein receiving the financial rules comprises receiving financial professional input selecting one or more financial rules from a set of one or more previously constructed financial rules and associating the selected one or more financial rules with one or more client accounts of at least one client consumer associated with the financial professional.

24. The method of claim 17, wherein receiving the financial rules comprises receiving a first rule from a supervisory professional having a supervisory level of authority of a business entity of the financial professional, the received first rule to be applied to a plurality of accounts of the business entity, the plurality of accounts associated with different financial professionals of the business entity.

25. The method of claim 17, wherein the financial rules are associated with one or more client accounts of a subset of one or more client consumers associated with a given financial professional.

26. The method of claim 17, further comprising displaying, at a supervisory professional computing system, a subset of the alert data.

27. The method of claim 17, wherein at least a portion of the alert data is displayed in tabular form, and one or more alerts are configured to be linked through user-activatable links to detail data associated with the at least a portion of the alert data.

28. The method of claim 17, wherein the one or more alerts are further linked directly to a data location within financial data of the client consumer at which a correction may be entered to eliminate the condition that caused the alert to be generated.

29. A non-transitory computer-readable medium storing a plurality of computing processor-executable instructions which, when executed by a computing processor, perform operations comprising:
   requesting, by the application program, a first component of an alert engine to be provided by the database to the application program, the alert engine configured to operate as at least two separate executable optional add-on components of one or more software programs, at least first and second components of the alert engine stored in a database external to an application computing system executing the application program;
   receiving, at the application computing system from the financial professional computing system, login data including financial professional specific login data of a financial professional which matches previously provided login data of the application computing system;
   in response to receiving the matching login data, providing by the application program computing system at least a portion of application program process operations to the financial professional computing system;
   receiving, at the application program, the first component of the alert engine;
   in response to receiving the first component, executing the first component, the execution of at least a portion of the first component configured to interact with a third component of the alert engine present on a financial computing system distinct from the application computing system;
   continually aggregating, using data source login credentials of specified financial professionals and specified clients at the application computing system, financial data from a plurality of data sources, the aggregated financial data including financial data of different types and corresponding to specified clients of specified financial professionals, the aggregation process an ongoing process during which other process operations are executed;
   receiving two or more financial rules each of which is associated with client accounts of at least two client consumers, a first one of the received financial rules active for a first client account of a first client but not for a second client account of a second client, and at least a second one of the received financial rules active for the second client account of the second client but not for the first client account of the first client, at least one of the received two or more rules created by a financial professional having supervisory responsibility across an entire firm, at least two rules received from two different financial professionals having joint responsibility for at least a same single client account, at least one or the received rules regarding financial transactions occurring outside a geographical boundary;
   analyzing the financial data to determine whether a condition set by one or more of the active financial rules of a particular client account is not satisfied, the analysis of a given client account including only rules applicable to the given client account, the analysis beginning with a client account having a greatest quantity of data needing analysis, proceeding with a next client account having a next-greatest quantity of data needing analysis, and continuing until all client accounts having data needing analysis have been analyzed;
   storing alert data indicating one or more alerts associated with one or more unsatisfied conditions, the stored alert data including a link to a data record at which a noncompliant portion of the analyzed data is configured for amendment to bring the noncompliant portion into compliance;
   receiving, following storage of the alert data, identification information of a financial professional;
   validating the identification information as associated with an authorized financial professional user of the application program;
   automatically learning a normal time for receiving an external response from an external entity, the normal time determined from one or more past events requiring a response from the external entity following an application submission that requires a response;
   automatically establishing an alert-based rule configured to trigger the generation of alert data following the passage of the normal time period without receiving a response to a submitted application;
   retrieving, in response to receiving the validation, stored alert and link data corresponding to one or more alerts associated with one or more client consumers of the authorized financial professional user, the alert data generated in response to a triggered rule; and
   displaying, at a financial professional computing system, the stored alert and link data.

30. The method of claim 29, wherein the application program is selected from the group of application programs consisting of:
   a financial application program;
   a tax preparation application program;
   a bookkeeping application program;
   an application program for generating profit and loss reports;
   an application program for generating invoices;
   an accounting application program; and
   an application program for managing payroll activities.

31. The method of claim 29, wherein analyzing the financial data further comprises analyzing the financial data by an alert engine to determine whether a condition set by one or more of the financial rules of a client account is not satisfied and the alert engine is executing as a network accessible service on an alert computing system coupled through the network to an application computing system executing the application program.

32. The method of claim 29, wherein the alert engine is configured to be dynamically loaded into and executed by the financial professional computing system, on request of the application program.

33. The method of claim 29, wherein the financial rules include rules data associated with each financial rule, the rules data indicating one or more financial professionals associated with each financial rule.

34. The method of claim 29, wherein a first financial rule is associated with a first financial professional, a second financial rule is associated with a second financial professional, and a third financial rule is associated with both of the first and second financial professionals.

35. The method of claim 29, wherein receiving the financial rules comprises receiving financial professional input selecting one or more financial rules from a set of one or more previously constructed financial rules and associating the selected one or more financial rules with one or more client accounts of at least one client consumer associated with the financial professional.

36. The method of claim 29, wherein receiving the financial rules comprises receiving a first rule from a supervisory professional having a supervisory level of authority of a business entity of the financial professional, the received first rule to be applied to a plurality of accounts of the business entity, the plurality of accounts associated with different financial professionals of the business entity.

37. The method of claim 29, wherein the financial rules are associated with one or more client accounts of a subset of one or more client consumers associated with a given financial professional.

38. The method of claim 29, further comprising displaying, at a supervisory professional computing system, a subset of the alert data.

39. The method of claim 29, wherein at least a portion of the alert data is displayed in tabular form, and one or more alerts are linked through user-activatable links to detail data associated with the at least a portion of the alert data.

40. The method of claim 29, wherein the one or more alerts are further configured to be linked directly to a data location within financial data of the client consumer at which a correction may be entered to eliminate the condition that caused the alert to be generated.

\* \* \* \* \*